Nov. 11, 1952     C. E. MANDEVILLE ET AL     2,617,955
APPARATUS FOR DETECTING ATOMIC AND NUCLEAR RADIATIONS
Filed Aug. 24, 1950     3 Sheets-Sheet 1
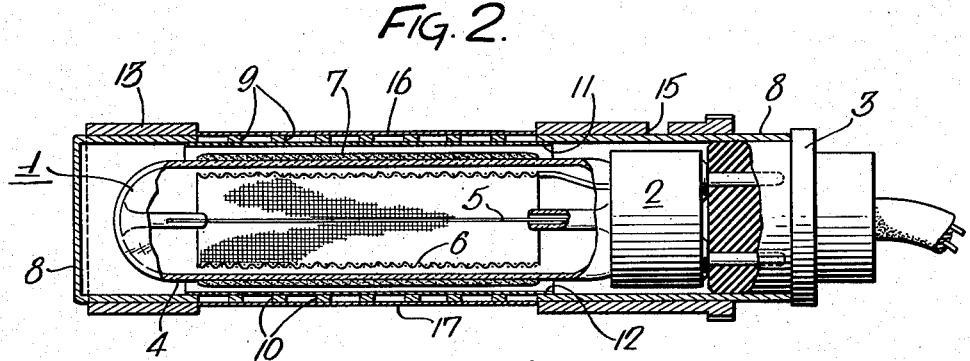
FIG. 2.
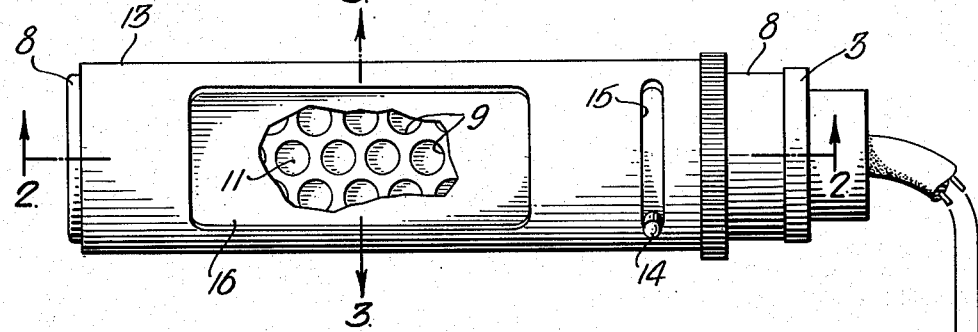
FIG. 1.
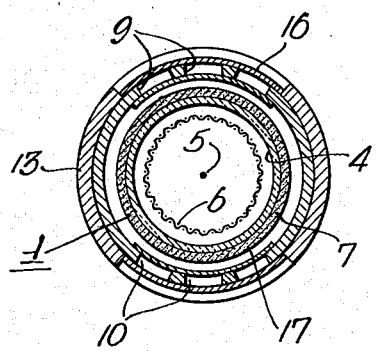
FIG. 3.
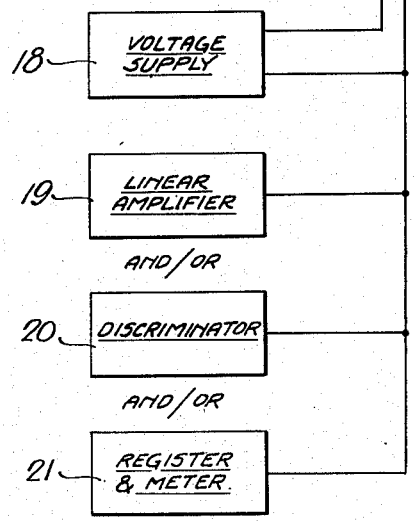
Inventors:
Charles E. Mandeville
Herbert O. Albrecht
Morris V. Scherb
by their Attorneys
Howson & Howson

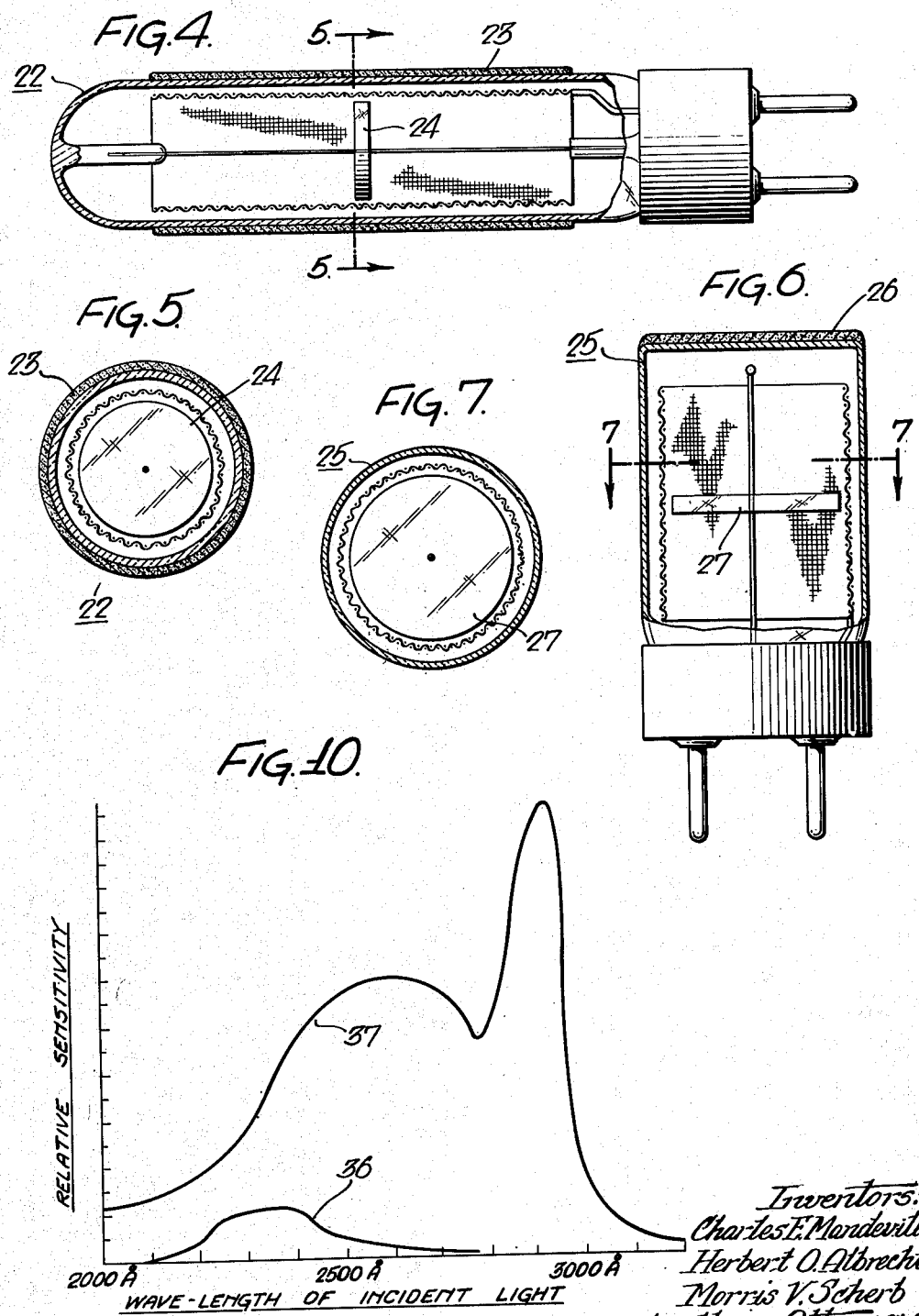

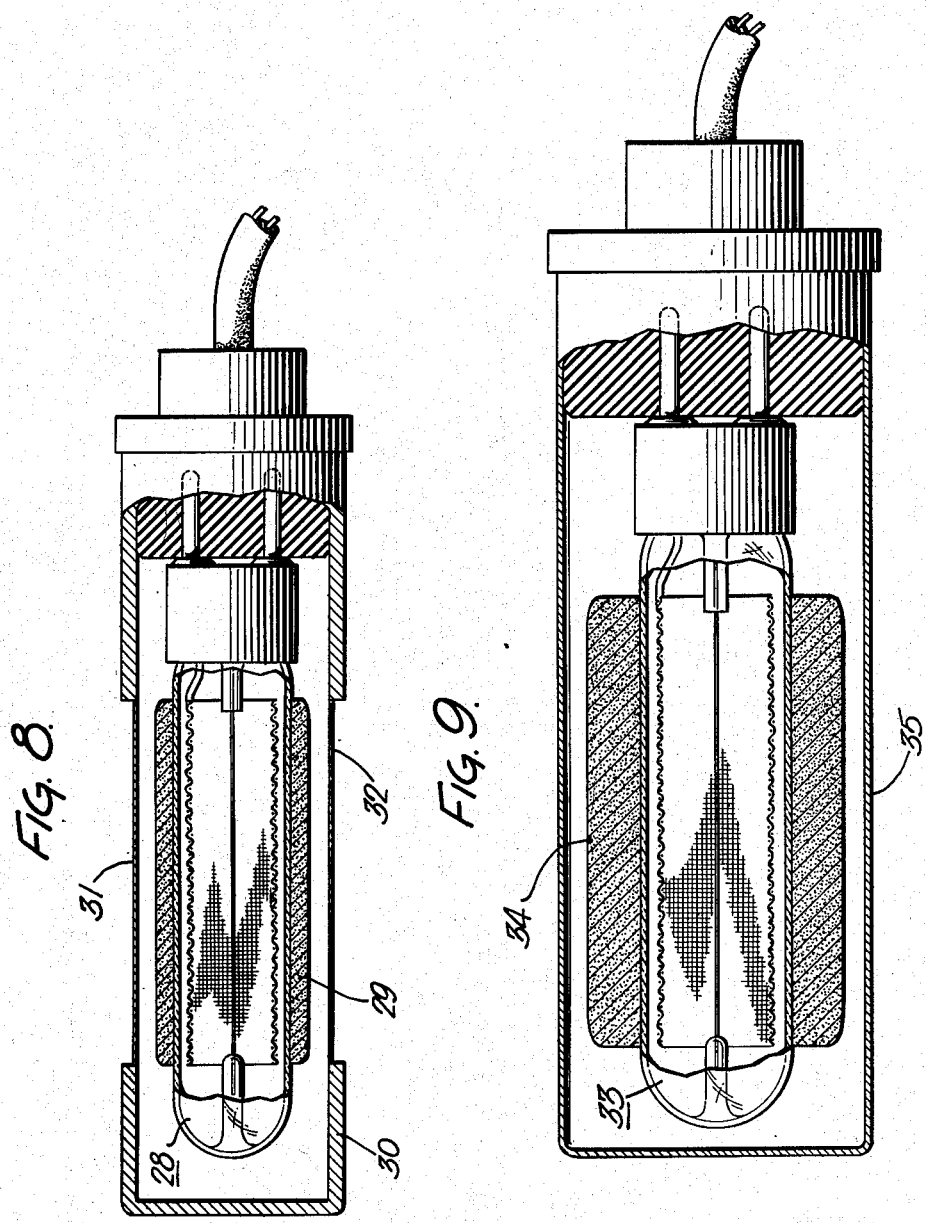

Patented Nov. 11, 1952

2,617,955

UNITED STATES PATENT OFFICE 2,617,955

APPARATUS FOR DETECTING ATOMIC AND NUCLEAR RADIATIONS

Charles E. Mandeville, Drexelbrook, and Herbert O. Albrecht, Springfield, Pa., and Morris V. Scherb, Princeton, N. J., assignors to Nuclear Research Corporation, Philadelphia, Pa., a corporation of Pennsylvania Application August 24, 1950, Serial No. 181,184

1 Claim. (Cl. 313—93)

The present invention relates to the detection of atomic and nuclear radiations.

One object of the invention is to provide a novel system or device for the detection of the aforementioned radiations, which device is more efficient than prior devices heretofore employed for the same general purpose.

Another object of the invention is to provide a system or device for the stated purpose which is characterized by its simplicity and which is, therefore, capable of economic manufacture.

Still another object of the invention is to provide a highly efficient scintillation system employing a novel scintillating medium.

A further and more specific object of the invention is to provide a novel system or device for the stated purpose which is characterized in that it employs a combination of a medium capable of producing light scintillations when subjected to at least some of the above-mentioned radiations, and a Geiger-Mueller photon counter in cooperative association with said medium to receive the light scintillations.

Heretofore, the aforementioned radiations have been detected by one or more of the following devices or techniques. (1) by cloud chambers, ionization chambers and Geiger-Mueller counters utilizing ionization and gas amplification techniques; (2) by tracks produced in photographic emulsions; (3) by scintillation systems employing various phosphors or crystals together with electron photomultipliers; and (4) by solid crystals such as diamonds employing conductive principles.

We have discovered certain new scintillating crystal mediums which made scintillation detection much more efficient.

We have further discovered that it is possible to utilize a Geiger-Mueller photon counter in combination with a medium capable of producing light scintillations in response to the aforementioned radiations, and that this combination produces a system or device wihch is far superior in various respects to any of the above-mentioned prior systems or devices. The use of light scintillation in conjunction with a Geiger-Mueller counter is highly advantageous. In recent years, scintillation techniques have been recognized as having inherent advantages and such techniques have grown rapidly in use, particularly for relatively high efficiency gamma ray and alpha particle detection and for high speed counting. The Geiger-Mueller counter also has important advantages, among which are the following. (1) It is the most sensitive instrument known to science in its ability to detect a single electron; (2) It offers an unlimited solid angle of detection with no limitations as to size; (3) The associated electronic equipment is of simple nature and lends itself readily to portable operation; (4) The Geiger-Mueller counter is free of many of the disadvantages inherent in photomultiplier operation, such as dark current, pulse size distributions, amplification, cooling, etc.

So far as is known, it is broadly new to employ light scintillation in conjunction with a Geiger-Mueller counter, thereby providing a scintillation counter having the inherent advantages of scintillation techniques and also having the inherent advantages of the Geiger-Mueller counter. While certain embodiments will now be described with reference to the accompanying drawings, it is to be understood that the invention contemplates the use of any scintillating medium in combination with a Geiger-Mueller photon counter, in any suitable arrangement.

In the accompanying drawings:

Fig. 1 is an elevational view of one form of counter embodying the invention, the associated equipment being represented in block form.

Figs. 2 and 3 are sectional views taken respectively along line 2—2 and line 3—3 of Fig. 1;

Fig. 4 is a longitudinal sectional view of another form of counter embodying the invention;

Fig. 5 is a sectional view taken along line 5—5 of Fig. 4;

Fig. 6 is a longitudinal sectional view of still another form of counter embodying the invention;

Fig. 7 is a sectional view taken along the line 7—7 of Fig. 6;

Figs. 8 and 9 are longitudinal sectional views of further embodiments of the invention; and Fig. 10 is a graphical illustration showing the response characteristic of the photosensitive cathode surface treated according to the invention.

Referring first to Figs. 1 to 3, there is shown a radiation detector or counter constructed according to the present invention and adapted for the selective detection of atomic and nuclear radiations. A Geiger-Mueller photon counter 1 is provided having a base 2 cooperable with a socket 3, a glass envelope 4 extending from the base, a wire (e. g. tungsten) anode 5 extending axially within the envelope, and a cathode 6 which may take the form of a cylindrical copper gauze member, although the cathode may also be in the form of evaporated or sputtered metal on the inside of the glass envelope, suitable metals for this purpose being gold, silver, cadmium, nickel, etc. As hereinafter described, the counter preferably is treated in a certain manner to increase the quantum efficiency of the cathode surface.

In cooperative association with the photon counter, there is provided a scintillating medium which may be in the form of a layer or coating 7 on the outside of the glass envelope, which layer may have a thickness of about four mils. Of course the thickness is necessarily exaggerated in the drawings. The said layer or coating comprises a material which is capable of producing light scintillations in response to radiations to be detected, the quanta emission being sufficient to activate the photosensitive cathode to effect highly efficient detection of the radiations. The composition of the scintillating medium 7 will be described hereinafter.

In the embodiment shown in Figs. 1 to 3, there is provided a steel shield 8 which fits over the socket 3 so as to enclose the counter, and which is provided with oppositely arranged perforations 9 and 10. Thin metal foils 11 and 12 are provided on the shield 8 adjacent the perforations, which foils may be composed of aluminum, silver or gold. Their purpose is to keep out light while permitting the passage of alpha particles. Therefore, they should be very thin, e. g. one mil or less in thickness. They may be secured in any suitable manner, as by means of an adhesive.

Surrounding the shield 8, there is provided a steel or like shell 13 which is rotatable on the shield 8 within a range of about 90° determined by a pin 14 on the shield 8 and a cooperating slot 15 in the shell 13. The shell 13 is also provided with very thin (e. g. one mil or less) aluminum sections 16 and 17 which may be moved into or out of alignment with the apertures 9 and 10 by rotation of the shell 13. When these thin aluminum sections are aligned with the apertures 9 and 10, the device is adapted to detect alpha particles by scintillation, and it is also adapted to detect beta and gamma radiations by ionization, the latter radiations passing through the thin layer 7. However, when the thin aluminum sections 16 and 17 are not aligned with the apertures 9 and 10, the outer shell 13 serves to stop alpha particles but the device will still detect the more penetrating radiations by ionization.

The blocks numbered 18 to 21 in Fig. 1 represent conventional devices commonly employed with radiation counters. Such devices may be utilized according to the particular use to which the system is applied in an instance. For simple alpha, beta and gamma detection (Geiger-Mueller region of operation), the system would utilize a high voltage supply, amplifier, and register or meter. For alpha detection alone (proportional region operation), the system would utilize a linear amplifier, discriminator amplifier, and register or meter.

In Figs. 4 and 5, there is shown a counter which is adapted for alpha detection only. Although not shown, a light shield may be employed. The counter 22 is similar in construction to the counter 1 of the preceding figures, and likewise has associated with it a scintillating medium 23 in the form of a thin layer. In this instance, however, a plastic disk 24, which may be formed of Plexiglas or Lucite, is supported on the anode wire midway of the counter and serves to pass ultraviolet quanta emitted by the scintillating medium 23 when the latter is struck by alpha particles but to stop all beta rays and Compton secondaries produced by gamma rays.

In the operation of this device, an alpha particle striking anywhere along the layer 23 will cause the counter to fire over its entire length, thus producing a full voltage pulse. But a beta or gamma particle will pass through the layer 23 and will fire only one-half of the counter by ionization, the disk 24 preventing operation over the full length of the counter. Consequently a half pulse will be produced. By employing a biased amplifier to pass only the full voltage pulses, only the alpha particles will be detected. The apparatus used with the detector in this instance may include a high voltage supply, discriminator amplifier, and register or meter.

In Figs. 6 and 7, there is shown a different construction of the same type of counter also adapted for alpha detection only. In this instance, the counter 25 is provided at its end with a thin scintillating layer 26, and a plastic disk 27, which may be formed of Plexiglas, is supported by the anode wire and serves the same purpose as does the disk 24 in Fig. 4. The operation is the same as in the case of the device of Fig. 4. The only difference between the two devices being in the specific construction.

In Fig. 8, there is shown an embodiment for scintillation detection of soft beta rays, which will also detect any gamma background. In this instance, the counter 28 is similar to the counter 1 in Figs. 1 to 3, but the scintillation layer or coating 29 is at least one-eighth of an inch in thickness. A protective shield 30 surrounds the cathode and has thin (e. g. one mil or less) aluminum foil sections 31 and 32 to keep out light but to permit passage of the soft beta rays. In this instance, the thick layer 29 stops the beta particles which cause scintillation. Alpha particles are relatively ineffective because of the thickness of the layer. The apparatus used with this detector may comprise a high voltage supply, amplifier, and register or meter.

In Fig. 9, there is shown an arrangement for scintillation detection of gamma radiations. In this instance, the counter 33 is similar to the counter 1 in Figs. 1 to 3, but the scintillating medium 34 is at least one-half inch in thickness. A protective shield 35 surrounds the counter to prevent passage of alpha and beta particles as well as light, but to permit passage of the gamma particles. In this instance the thick layer 34 stops the gamma particles and they cause scintillation. The apparatus used with this detector may comprise a high voltage supply, amplifier, and register or meter.

In each of the above-described embodiments, the scintillating medium comprises a crystal suitable for use according to the invention. We have discovered that sodium chloride or sodium bromide crystals, with silver added thereto in proper quantity, are well suited for the purpose of the invention. In the preparation of sodium chloride-silver (NaCl-Ag) crystals, pure sodium chloride is melted in a platinum crucible, and then silver chloride is added to the extent of .03% to 1% by weight, the usual concentration being about 0.5%. The activity of such crystals is proportional to the concentration of silver chloride within the range indicated. Below this range, the activity decreases rapidly, and above the crystals lose transmission and become cloudy. The two compounds are melted together and the molten composition is then poured into a dish where it is left to cool to room temperature, thus forming the desired crystals.

The preparation of sodium bromide-silver (NaBr-Ag) crystals is carried out in the same manner, by melting together sodium bromide and silver chloride. However, in this instance, the silver chloride is added to the extent of 1% to 5% by weight, the usual concentration being about 3%.

Other materials which have thus far been found suitable for use according to the invention are lithium bromide, lithium chloride, and powdered durene.

Crystals of the character above described have a spectral emission in the 2000 Å.–3000 Å. region, which substantially matches the photosensitive response of the cathode surface of the photon counter when the latter is treated in the manner hereinafter described. Accordingly, the crystals cooperate with the treated cathode surface to provide highly efficient scintillation detection.

In the above-described embodiments, the crystal layer or coating may be applied in any suitable manner. For example, the counter tube, after the treatment described below, may be dipped into the prepared molten crystal material while the latter is in a molten state, prior to cooling of the material to room temperature. In such case, the material will cool and crystallize on the envelope of the tube. An alternative procedure would be to apply the molten material with a brush. In the case of the beta and gamma detectors, where the layer or coating is relatively thick, the same procedure may be followed or the cooled crystals may be adhesively applied to the tube. If necessary, a thick layer of crystals could be supported by providing an outer glass shell within which the crystals could be packed. It will be understood, therefore, that the invention contemplates any suitable method of applying and/or supporting the crystal material.

As previously mentioned, the invention further contemplates treatment of the cathode surface of the Geiger-Mueller photon counter to increase its quantum efficiency. In carrying out this treatment, the Geiger-Mueller photon counter is filled in the usual manner, usually with a hydrocarbon quenching mixture, care being exercized to keep the cathode surface as clean as possible by means of hydrogen reduction. The counter is then connected to a high voltage supply and is immersed in a bath of liquid air. A cyclic discharge is then applied to the cathode, with the anode positive and the cathode negative, the voltage being varied from approximately 800 volts to 1500 volts, and the current being limited by a 50,000 ohm load reristor to a maximum value of 20 milliamperes. This cyclic variation is carried out over approximately a one minute cycle, to keep the arc moving over the entire cathode surface, for a total period of from twenty minutes to three hours, depending on the time required to increase the quantum efficiency of the cathode surface to the desired extent. This will vary from one tube to another. The efficiency may be determined by known techniques. After the treatment, the counter is permitted to assume room temperature and is ready for use.

The above-described treatment produces a marked increase in the quantum efficiency of the surface throughout the 2000 Å.–3000 Å. region, and it also shifts the peak response closer to 3000 Å. Fig. 10 shows two curves 36 and 37, the former being the response of the untreated cathode surface and the latter being the response of the treated cathode surface.

Since the spectral emission of the above-described crystals is in the 2000 Å.–3000 Å. region, the treatment of the cathode provides a much greater response and, therefore, a higher overall cathode efficiency than an untreated cathode surface. Thus the treatment of the cathode substantially matches the cathode response to the spectral emission of the crystals.

While the invention contemplates particularly the use of the above-mentioned scintillating crystals in combination with a Geiger-Mueller photon counter, it is within the purview of the invention to employ such crystals in combination with other photosensitive devices such as photomultipliers.

It will be understood, of course, that the invention is not limited to the embodiments disclosed but contemplates such further embodiments or modifications as may occur to those skilled in the art.

We claim:

A radiation detector device, comprising a Geiger-Mueller photon counter having a light-transmissive envelope, a very thin layer of scintillating material on said envelope, a light-excluding shield surrounding said layer and having a portion permeable by alpha, beta and gamma particles, whereby the device may detect alpha particles by scintillation and may detect beta and gamma particles by ionization, and a second shield surrounding said first shield and adjustable at will to exclude all but the gamma particles.

CHARLES E. MANDEVILLE.
HERBERT O. ALBRECHT.
MORRIS V. SCHERB.

REFERENCES CITED

The following references are of record in the file of this patent:

UNITED STATES PATENTS

| Number | Name | Date |
| --- | --- | --- |
| 2,351,028 | Fearon | June 13, 1944 |
| 2,449,697 | Graves et al. | Sept. 21, 1948 |
| 2,485,586 | Goldstein | Oct. 25, 1949 |
| 2,524,100 | Dauvillier et al. | Oct. 3, 1950 |

OTHER REFERENCES

"Solid Counters—Scintillation Counters"—Wouters AECD—2203, June 30, 1948, pp. 1–9.

"Inorganic Crystals for the Detection of High Energy Particles and Quartz"—Moon, Phys. Review—May 15, 1948, page 1210.